No. 762,859. PATENTED JUNE 14, 1904.
W. C. DAVIS.
PULVERIZING ROLLS.
APPLICATION FILED NOV. 11, 1902.
NO MODEL. 6 SHEETS—SHEET 1.

WITNESSES: INVENTOR.
Wm. C. Davis.
BY
ATTORNEY.

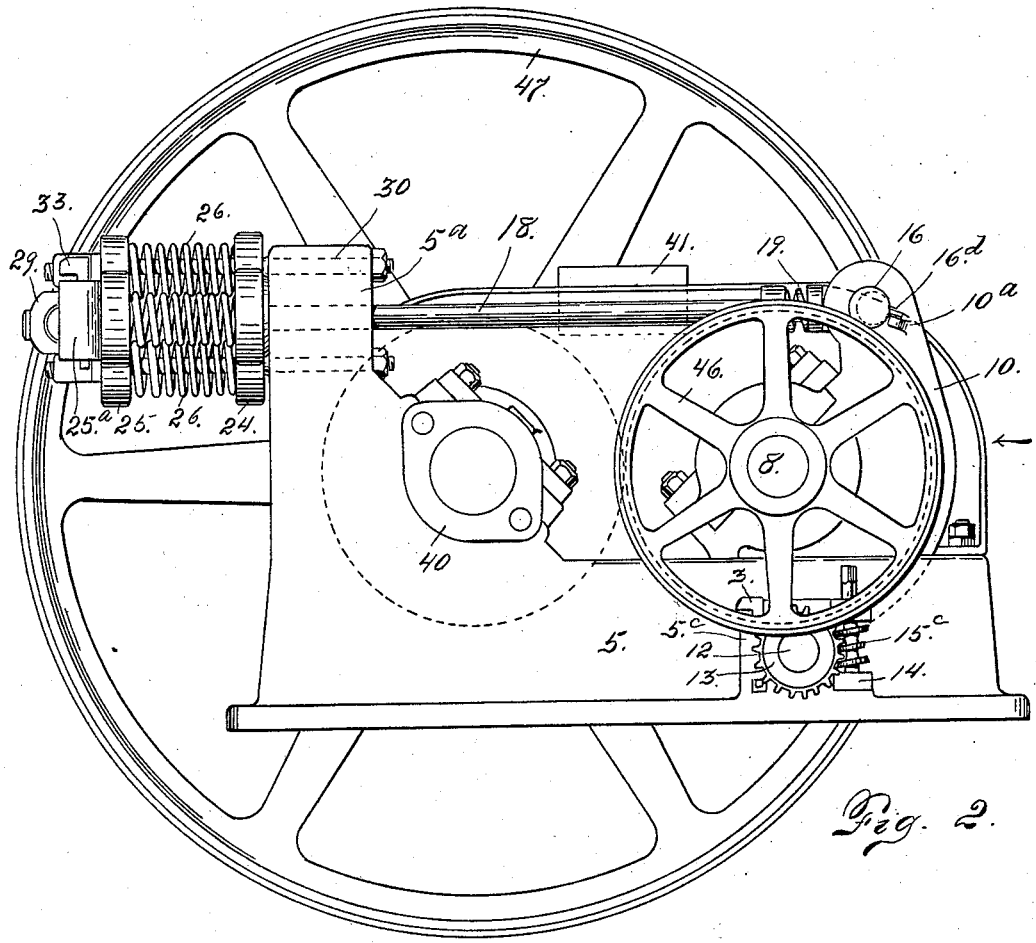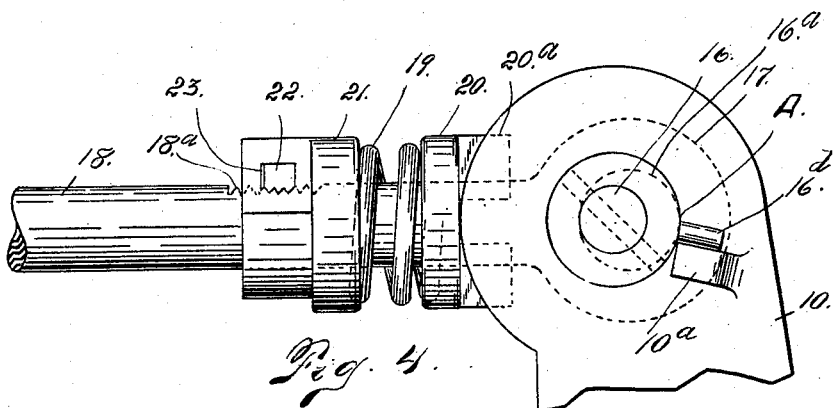

No. 762,859. PATENTED JUNE 14, 1904.
W. C. DAVIS.
PULVERIZING ROLLS.
APPLICATION FILED NOV. 11, 1902.
NO MODEL. 6 SHEETS—SHEET 3.

WITNESSES:
Otto E. Hoddick.
Dena Nelson.

Wm. C. Davis.
INVENTOR.
BY
ATTORNEY.

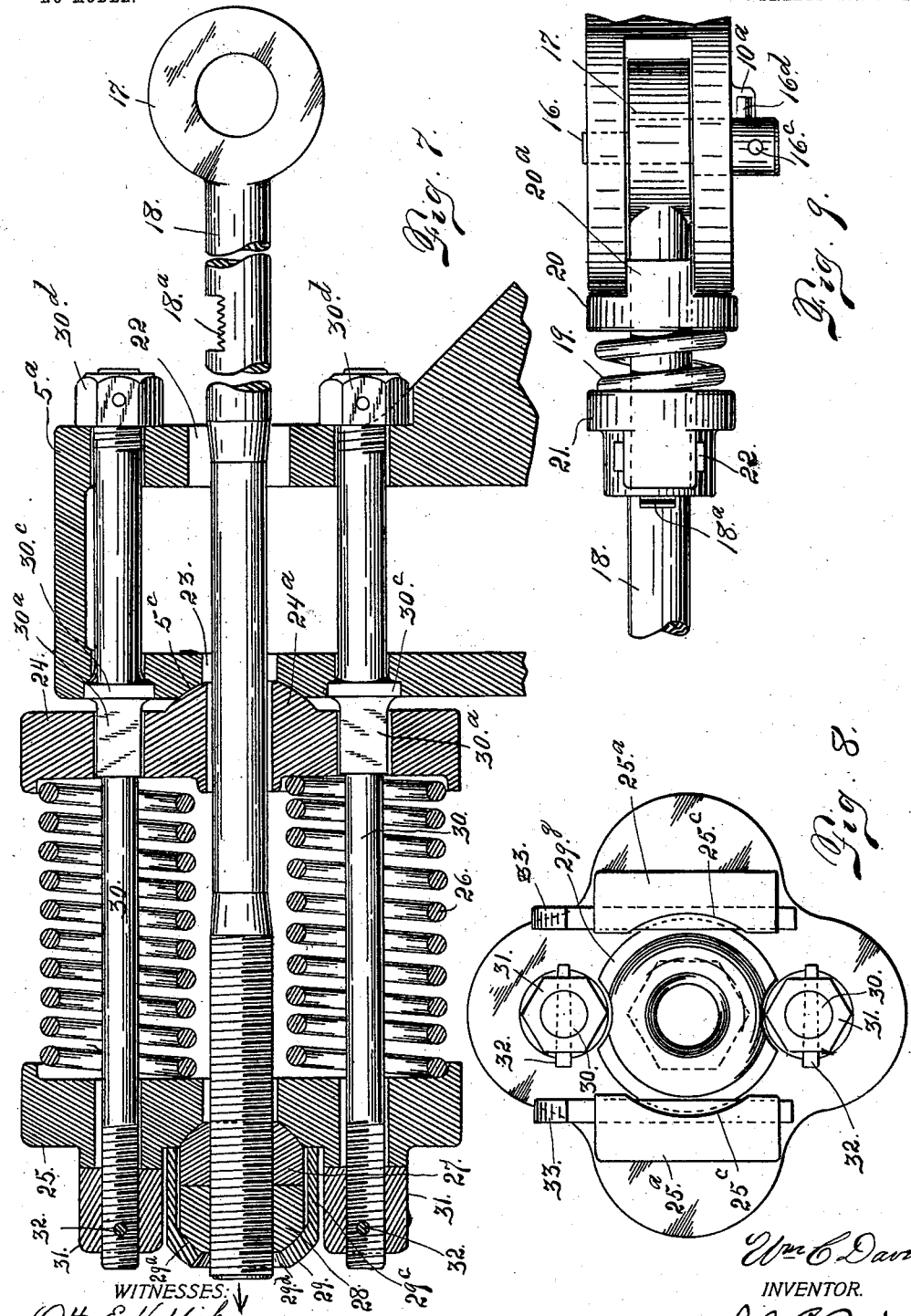

No. 762,859. PATENTED JUNE 14, 1904.
W. C. DAVIS.
PULVERIZING ROLLS.
APPLICATION FILED NOV. 11, 1902.
NO MODEL. 6 SHEETS—SHEET 5.

WITNESSES:
Otto E. Hoddick
Dena Nelson

Wm C Davis
INVENTOR.
BY
ATTORNEY.

No. 762,859. PATENTED JUNE 14, 1904.
W. C. DAVIS.
PULVERIZING ROLLS.
APPLICATION FILED NOV. 11, 1902.
NO MODEL. 6 SHEETS—SHEET 6.

Witnesses
Otto E. Haddick
Dena Nelson

Inventor
Wm. C. Davis
By
Attorney

No. 762,859.

Patented June 14, 1904.

UNITED STATES PATENT OFFICE.

WILLIAM C. DAVIS, OF DENVER, COLORADO.

PULVERIZING-ROLLS.

SPECIFICATION forming part of Letters Patent No. 762,859, dated June 14, 1904.

Application filed November 11, 1902. Serial No. 130,924. (No model.)

*To all whom it may concern:*

Be it known that I, WILLIAM C. DAVIS, a citizen of the United States of America, residing at Denver, in the county of Arapahoe and State of Colorado, have invented certain new and useful Improvements in Pulverizing-Rolls; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in pulverizing-rolls, my object being to provide an apparatus of this class which shall be an improvement from the standpoints of durability and general efficiency over the constructions heretofore used; and to this end the invention consists of the features, arrangements, and combinations hereinafter described and claimed, all of which will be fully understood by reference to the accompanying drawings, in which is illustrated an embodiment thereof.

Figure 1:
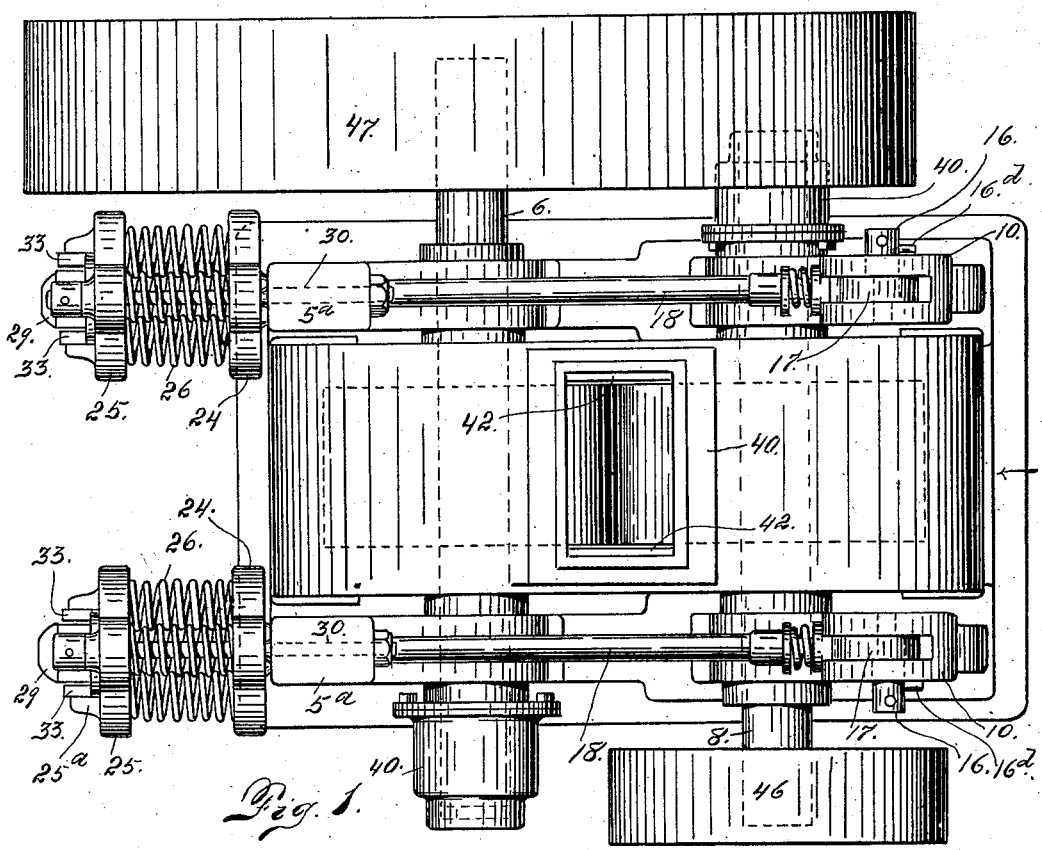
Figure 3:
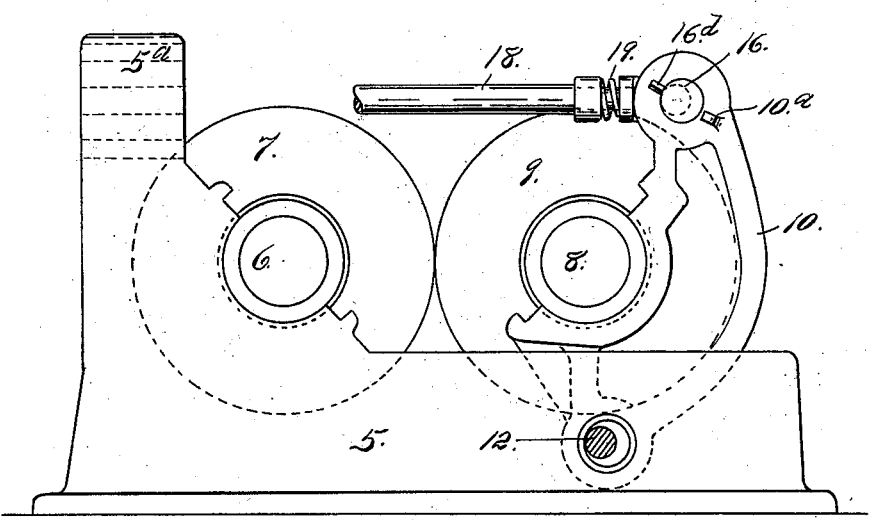
Figure 5:
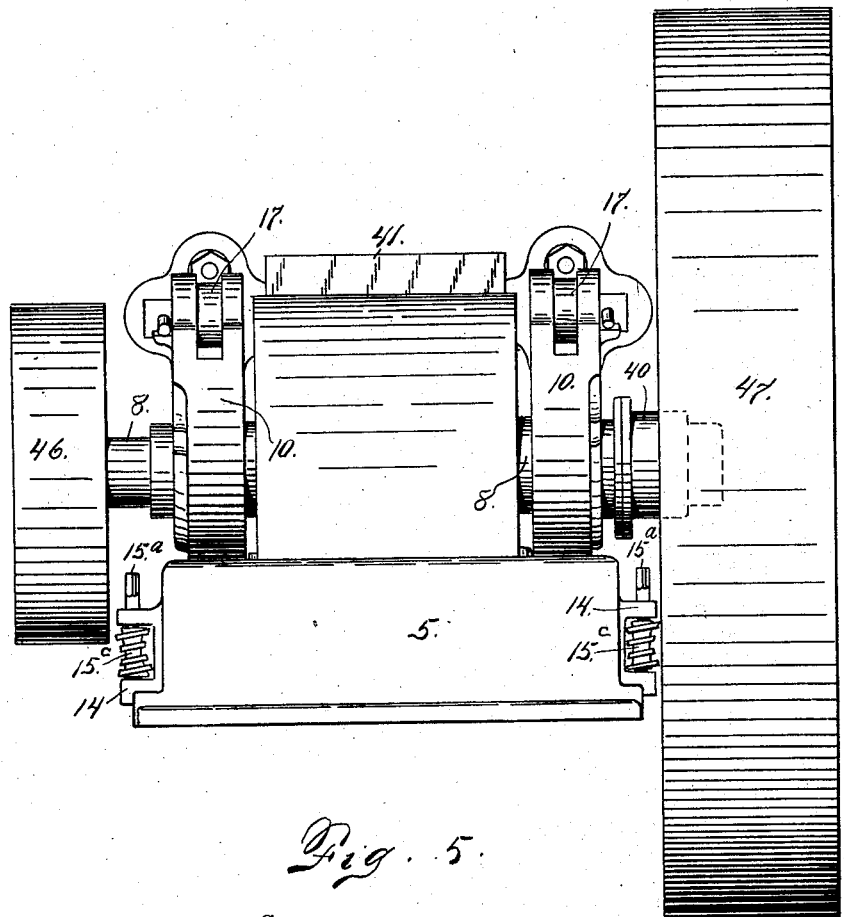
Figure 6:
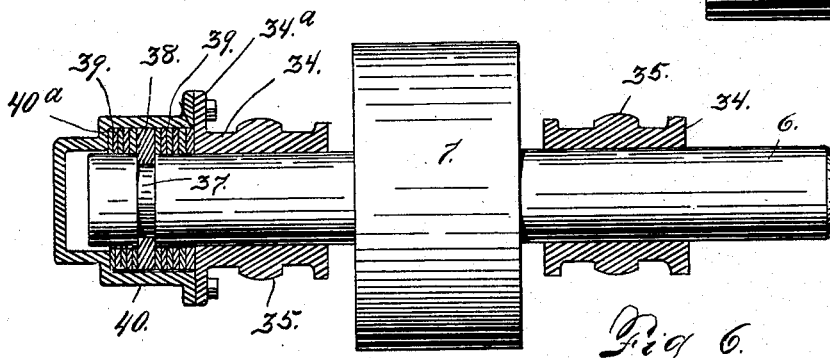
Figure 10:
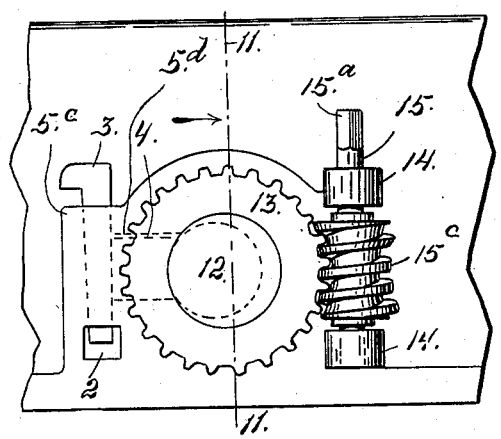
Figure 11:
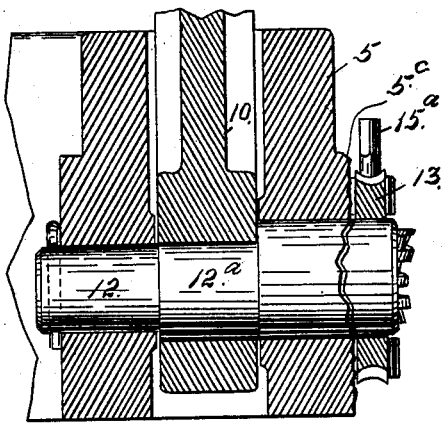
Figure 12:
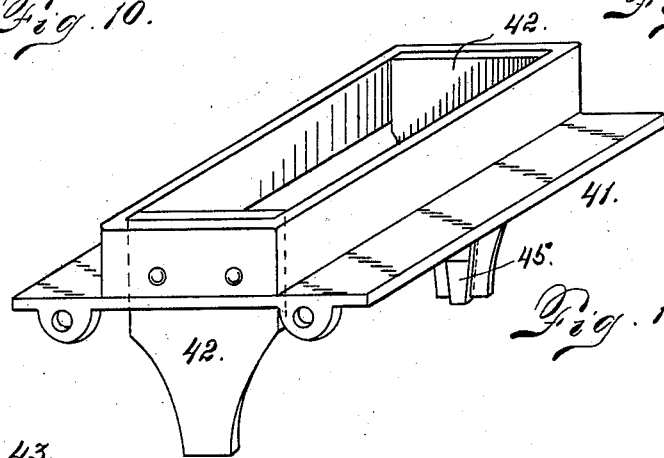
Figure 13:
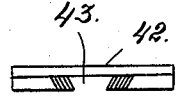
Figure 15:
Figure 14:
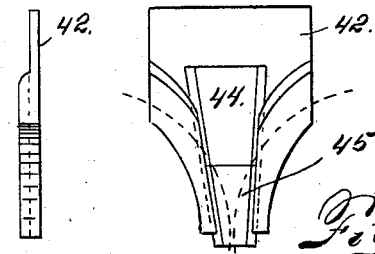
Figure 16:
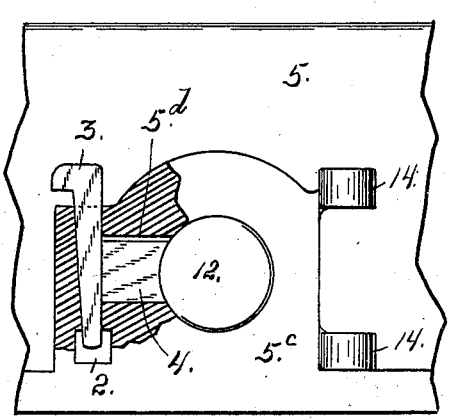
Figure 17:
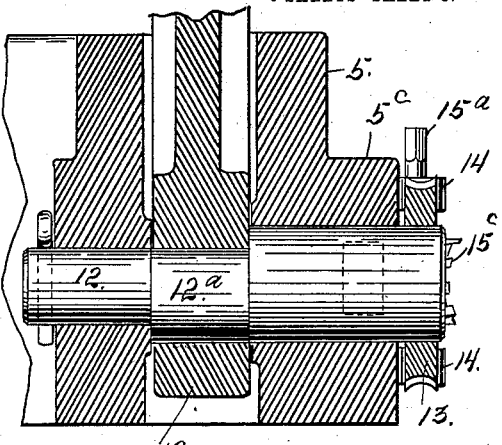
Figure 18:
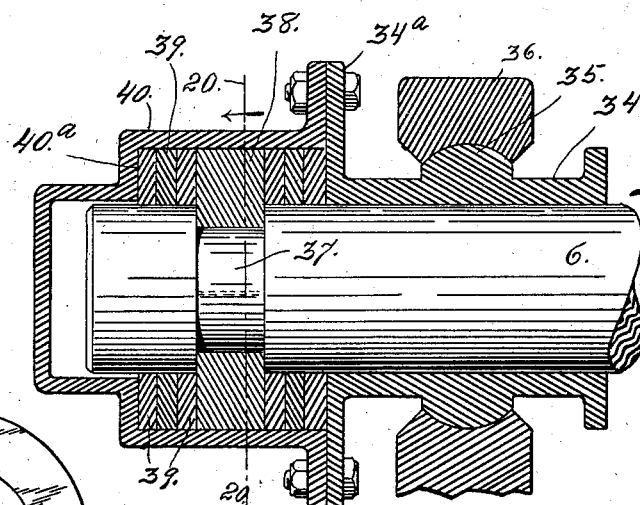
Figure 19:
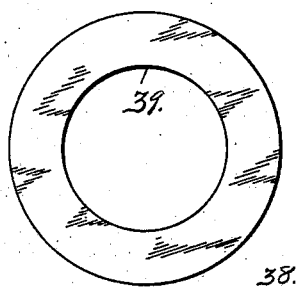
Figures 20, 21:
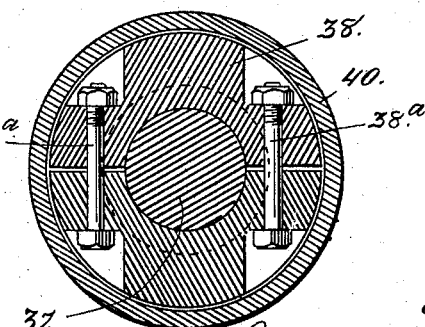

In the drawings, Figure 1 is a top or plan view of a pair of pulverizing-rolls equipped with my improvements. Fig. 2 is a side elevation of the same. Fig. 3 is a side elevation of the rolls, parts being removed in order to better illustrate certain novel features of construction. Fig. 4 is a fragmentary detail view, on an enlarged scale, illustrating the connection of a tension-rod with the upper extremity of the adjustable swinging yoke-arm or frame member. Fig. 5 is an end elevation of the construction shown in Figs. 1 and 2 looking in the direction of the arrows in said figures. Fig. 6 is a detail view of one of the rolls and its shaft, illustrating a special construction of journal-box permitting a movement of the roll-shaft whereby one of its extremities may be raised or lowered without strain on the shaft. Fig. 7 is a section, on a larger scale, taken through the collars, interposed springs, and a ball-and-socket joint of the tension-rod. Fig. 8 is an end elevation of the same. Fig. 9 is a top view of the construction shown in Fig. 4. Fig. 10 is a fragmentary view showing the worm-gear construction for regulating the adjustable swinging yoke-arms or frame members in which one of the rolls is mounted. Fig. 11 is a section taken on the line 11 11, Fig. 10. Fig. 12 is a perspective view illustrating the hopper and cheek-plates. Fig. 13 shows a face view and top and bottom views of the cheek-plate in detail. Fig. 14 shows the cheek-plate with the detachable wearing-plates in place. Fig. 15 is an edge view of the cheek-plate. Fig. 16 is a view similar to Fig. 10, but shown partly in section and with the worm and worm-wheel removed. Fig. 17 is a section of the same with the worm and worm-wheel in place. Fig. 18 is an enlarged section taken through the cap, the washers, the split ring, and journal-box construction of one of the roll-shafts. Fig. 19 is a detail view of one of the washers. Fig. 20 is a section taken on the line 20 20, Fig. 18. Fig. 21 is an edge view of the split ring shown in detail.

The same reference characters indicate the same parts in all the views.

Let the numeral 5 designate the integral stationary cast-iron frame in which the shaft 6 of the roll 7 is journaled. This shaft and roll are held securely in place in the frame and have no movement except the rotary action incident to the performance of their function. The shaft 8 of the coöperating roll 9 is journaled in two movable swinging arms, yokes, or frames 10. These arms are located on opposite sides of the roll 9, their lower extremities being mounted on eccentrics $12^a$, formed on short shafts 12, journaled in the frame 5 (see Fig. 11) on opposite sides of the roll. These shafts protrude through the frame on the outside, and each is provided with a worm-wheel 13, made fast thereto or formed integral therewith. Journaled in suitable bearings 14, formed on the frame 5, is a spindle 15, provided with a worm $15^c$, engaging the teeth of the worm-wheel 13. The upper extremity of the worm-spindle is fashioned to receive a wrench for operating purposes, as shown at $15^a$. It is evident that by operating the worm-wheel the position of the shaft 8 and its roll 9 may be regulated at will. In order to lock each shaft 12 against possible movement after adjustment, a sliding abutment 4 is inserted in an opening $5^d$, formed in a lug $5^c$ of the frame and communicating with the shaft-opening. The abutment is inserted in this opening and forced tightly against the shaft 12 by a key 3, inserted in a vertical opening intersecting the opening $5^d$. At the lower extremity of the keyway a lateral opening 2 is formed to permit the insertion of an instrument for the purpose of loosening the key preparatory to its removal when it is desired to adjust the shaft through the instrumentality of the worm and worm-wheel, as heretofore described.

The upper extremity of each arm 10 is connected with a spindle 16 and is bifurcated to receive the eye 17 of a tension-rod 18. The spindle 16 is provided with an eccentric $16^a$, which engages the eye of said rod. The object of the eccentric is to hold the engaging surfaces tightly in contact and prevent undue wear on the connected parts. A spring 19 is located between two collars 20 and 21, mounted on the rod 18. The collar 20 engages the upper extremity of the yoke and has projections $20^a$, which pass between the two parts of its bifurcated portion. Where the rod 18 is surrounded by the collar 21 the rod is provided with a recess $18^a$, whose bottom is toothed to receive a key 22, entering a keyway 23, formed in the collar. By removing the key the collar 21 may be adjusted to regulate the tension of the spring 19, as desired, after which by the insertion of the key the collar is maintained in the adjusted position. The tension of the spring 19 may be further regulated by turning the spindle 16, which for this purpose is provided with an opening $16^c$ in one extremity to receive a handspike. This spindle extremity is also provided with a projection $16^d$, adapted to engage a stop $10^a$, formed on the upper extremity of the arm 10, when the spindle is turned to bring the point A of maximum eccentricity slightly below the axial line of the rod 18, whereby the spindle is normally held in the adjusted position. This tension-rod construction is double, there being one on each side of the machine to correspond with the two arms 10. Each of these tension-rods passes through openings 22 and 23, formed in the upper part of the frame 5. These openings are larger than the rod, leaving sufficient clearance to allow the latter to change its line of direction within certain limits as the arm 10 or the spindle 16 is adjusted. Beyond the frame part 5 the rod 18 passes through two separated plates or collars 24 and 25, both of which have openings larger than the rod. These collars are separated by coil-springs 26, arranged around the rod 18 and having their axes parallel or approximately parallel with the said rod. The collar 24 bears against the frame part $5^a$, which is provided with a recess $5^e$, which recess is curved or rounded to receive a boss $24^a$ to permit the collar 24 to move freely within certain limits, whereby it is allowed to automatically adjust itself to compensate for a possible difference in tension of springs 26, whose extremities are seated in the collars 24 and 25. The extremity of the rod remote from the yoke 10 is threaded to receive two half-nuts 27 and 28, having flat sides which engage each other and whose opposite surfaces are convex or rounded to form a sort of ball-and-socket joint with the collar 25 and a cap 29. The collar is provided with a curved or concave seat, which the convex surface of the nut 27 engages. The cap 29 is slipped over the threaded extremity of the rod and is provided with a curved part $29^a$ to fit the curve of the nut member 28 and with a cylindrical part $29^c$, which surrounds the two nut members. This cap is provided with an opening $29^d$, which is larger than the rod 18 to permit the latter to move at its ball-joint or change its line of direction while the cap remains stationary. The inner extremity of the cylindrical part of the cap engages a shoulder formed on the collar 25, surrounding its curved recess.

The collars 24 and 25 are connected beyond the rods 18 at diametrically opposite points by two rods 30, which pass through openings in the said collars and are surrounded by two of the interposed springs 26. These rods also pass through openings formed in the frame part $5^a$ and are provided with heads composed of nuts screwed thereon and fastened, the said heads bearing against the frame part $5^a$ on one side. The extremities of the rods 30 remote from the heads are threaded to receive nuts 31, which are screwed thereon to engagement with the collar 25. The nuts are secured in place by wedge-shaped keys 32, passed through registering openings formed in the nuts and rods. The cap 29 is provided at its inner extremity with a flange $29^g$, which is cut away at the top and bottom to receive the nuts 31. On opposite sides of the cap the collar 25 is provided with lugs $25^a$, in which are formed ways for keys 33, which when in place engage the flange 29 of the cap and hold the latter in place. The central portion of each lug is cut away, as shown at 25, to make room for the flange $29^g$ and allow the cap to pass to its position when the keys are removed. The cap may then be fastened by dropping the keys into place. By virtue of the construction just described the rod is relieved from all strain tending to bend or break it during the adjustment incident to its eye-extremity connections, as heretofore explained. It is evident that whenever the eye extremity of the rod is moved either up or down the opposite extremity of the rod will turn on its ball-joint, so that the pull or force applied to the rod incident to the pulling strain on the rolls will be in the line of the axis of the rod. If the extremity of the rod remote from the eye were rigidly held against movement, it is evident that there would be a bending or breaking strain on the rod whenever the eye extremity of the rod was moved to throw the axis of the rod out of its normal position either up or down.

Each roll-shaft (see Fig. 6) is provided with a sleeve 34 on each side of the roll. This sleeve forms a part of the boxing of the shaft and is provided with a curved rib 35, which fits a housing part 36 of corresponding shape interiorly. The function of this construction is to permit a limited tilting movement or inclination of the axis of the shaft without subjecting the latter to undue strain. One end of each shaft is provided with a circumferential groove 37, in which is located a divided ring 38, which is held against lengthwise movement on the shaft by engagement with the groove. On opposite sides of this collar are located washers 39, a number being located on each side of the collar. A cap 40 is applied to the end of the shaft surrounding the washers and the divided ring. This cap is bolted to a flange 34$^a$, formed on one of the sleeves 34. The cap has a shoulder 39$^a$, which engages the washer nearest the extremity of the shaft and holds the washers on that side of the ring in place. The function of this construction is to permit the shifting of the roll-shaft endwise and locking it in the adjusted position. In order to accomplish this, the cap 40 is removed and the divided ring taken out of the groove in the shaft. One or more washers 39 are then moved from one group of washers to the other group. The shaft is then shifted endwise sufficiently to permit the divided ring to be replaced in its groove, after which the cap is reapplied and the shaft held in the adjusted position. The divided ring members are bifurcated on opposite sides and fastened together by bolts 38$^a$. The reason or necessity for moving the shafts endwise is in order to shift the rolls to cause them to wear evenly. The faces of the pulverizing-rolls do not naturally wear even, there being a tendency to form circular grooves or corrugations in the pulverizing-faces of the rolls. The shifting of one roll by the endwise movement of the roll without moving the other roll has a tendency to bring these grooves or corrugations out of line with each other in the two rolls, and thereby overcoming the difficulty.

My improvements embrace certain novel features of cheek-plate construction applied to the hopper of the apparatus, which will now be described, special reference being made to Figs. 12, 13, and 14. Let the numeral 41 designate the hopper, which is mounted above the contact or tangential line of the rolls and secured in place in the usual or any suitable manner. To each end of this hopper is secured a cheek-plate whose face or inner surface is provided with a dovetail groove 43, in which are inserted detachable wearing-plates 44 and 45. These detachable plates are located where the cheek-plates are subjected to the greatest wear during the pulverizing operation. The reason for the division of the plates 44 and 45 is because the plate 45, which is nearer the longitudinal line of the rolls, will be subjected to greater wear, and it will therefore be necessary to renew this plate and substitute a new one more often than it will be necessary to renew the plate 44. Hence a division of these wearing-plates is made from a standpoint of economy. The object of the wearing-plates is to permit the renewal of the portions of the cheek-plates which are subjected to greatest wear without the necessity of renewing the entire plates.

The rods 30 where they pass through the collar or plate 24 are each provided with a portion 30$^a$, angular in cross-section, preferably square, to prevent the rod from turning while adjusting its nut. Each of these rods is also provided with a shoulder 30$^c$, which engages the frame and holds the rod securely in place thereon when the nut-heads 30$^d$ are screwed to position.

The tension of the springs 26 is so regulated that during the normal action of the rolls the springs are idle and perform no function except when something harder than the rock to be crushed passes between the rolls. In this last-named event the springs 26 yield to the pull on the tension-rod and allow the rolls to separate to permit the hard foreign object to pass between them without breaking the mechanism. The cap 29 being secured to the collar 25 by the keys 33, as aforesaid, prevents the tension-rod from moving through the said collar in the direction of the arrow in Fig. 7 when the parts are assembled and properly adjusted. This construction makes it practicable to maintain the rolls at any desired distance apart. The springs 26 are maintained at their normal tension by the rods 30.

When the term "movable roll" is used in this specification, the roll mounted in relatively movable bearings is intended, being the roll 8 in the construction in this specification.

When the apparatus is in use, power is applied to the rolls by connecting belts (not shown) with pulleys 46 and 47, fast on the shafts 6 and 8, respectively. The material to be pulverized is fed into the hopper and passes therefrom to the rolls in the usual manner.

Having thus described my invention, what I claim is—

1. In pulverizing-rolls, the combination with the swinging arms and tension-rods, of a spindle journaled in the upper extremity of each arm and having an eccentric which the eye extremity of the arm engages, means for adjusting the spindle to throw the maximum point of eccentricity out of line with the longitudinal axis of the rod, a collar slidably mounted on each rod adjacent its eye extremity and engaging the swinging arm, a stop on the rod, and a spring interposed between the stop and the sliding collar.

2. In pulverizing-rolls, the combination with the swinging arms and tension-rods, of a spindle having an eccentric upon which the eye extremity of each rod is mounted, one extremity of the spindle projecting beyond the arm and being provided with a pin, and the arm being provided with a lug located adjacent the spindle to form a stop for the pin of the spindle when the latter is properly adjusted, and a spring-actuated collar slidably mounted on each rod and engaging the swinging arm adjacent the eye extremity of the rod.

3. In pulverizing-rolls, the combination with swinging arms and tension-rods, of an eccentric-spindle journaled in the upper extremity of each arm, the eccentric of the spindle engaging the eye of the rod, a collar slidable on each rod and engaging the swinging arm, a stop fast on each rod and a spring interposed between the collar and the stop on the rod to hold the engaging surfaces tightly in contact for the purpose set forth.

4. In pulverizing-rolls, the combination with swinging arms and tension-rods, of a spindle journaled in the upper extremity of each arm, and having an eccentric with which the tension-rod is connected, a collar slidably mounted on the rod and bearing against the arm, a stop-collar fast on the rod, and a spring interposed between the two collars.

5. In pulverizing-rolls, the combination with the swinging arms and tension-rods, of a spindle journaled in the upper extremity of each arm and having an eccentric which the rod extremity engages, a collar slidably mounted on the rod and engaging the arm extremity, a second collar mounted on the rod, and a spring interposed between the collars, the second collar being adjustable on the rod to regulate the tension of the spring.

6. In pulverizing-rolls, the combination with the swinging arms and tension-rods, of a spindle journaled in the upper extremity of each arm and having an eccentric which the rod extremity engages, a collar mounted on the rod and engaging the arm extremity, a second collar mounted on the rod, a spring interposed between the two collars, the second collar having a keyway intersecting the rod-opening on one side, and the rod being toothed at the keyway intersection, and a toothed key inserted in the collar and engaging the teeth of the rod to lock the collar in position.

7. In pulverizing-rolls, the combination with a stationary frame, and tension-rods connected with the movable roll, of separated collars through which the tension-rods pass, springs interposed between the collars outside of the tension-rods, other rods connecting the collars with the frame and passing through openings in the latter, a nut screwed on each tension-rod adjacent the collar remote from the frame, a cap slipped over the end of the tension-rod and made to engage the nut thereon, and means applied to the adjacent collar and engaging the cap, whereby the tension-rod is prevented from passing farther through the frame after adjustment.

8. In pulverizing-rolls, the combination with a stationary frame and tension-rods connected with the movable roll, of separating collars or plates through which the tension-rods pass, springs interposed between the collars outside of the tension-rods, other rods connecting the collars with the frame and passing through openings in the latter, the rods last named having shoulders bearing against the frame on one side, and opposed to nuts applied to the rod extremities and engaging the frame on the opposite side whereby the rods are held in place on the frame, and means applied to the tension-rods adjacent the collars remote from the frame, to prevent the said rods from passing farther through the collars after adjustment.

9. In a pulverizing-roll construction, the combination with a tension-rod connected with a movable roll and passing through the frame, of two separated collars through which the tension-rod passes, springs interposed between said collars outside of the tension-rod, other rods connecting the collars with the frame and controlling the tension of the springs independently of the tension-rod connected with the roll, a nut applied to the tension-rod for holding the latter in operative relation with the collars, a cap slipped over the end of the tension-rod and engaging said nut, the cap having flanges, and keys applied to the collar remote from the frame, and engaging the flanges of the cap, to hold the latter in place, the collar having ways to receive the keys.

10. In pulverizing-rolls, the combination with swinging arms and tension-rods connecting the arms with the frame, of a spindle journaled in the upper extremity of each arm and having an eccentric which the eye extremity of the tension-rod engages to permit the separation of the rolls, and a spring-held collar slidable on each tension-rod adjacent its eye and engaging the swinging arm.

11. In pulverizing-rolls, the combination with a stationary frame and a swinging frame, of a tension-rod, two separated collars through which the rod passes, one of said collars bearing against the frame, a number of coil-springs interposed between the collars and whose axes are beyond the axis of the rod and parallel or approximately parallel therewith, and means connected with the tension-rod and engaging one of the collars for allowing the rod a ball-joint action.

12. In pulverizing-rolls, the combination with a stationary frame and swinging arms, of tension-rods connected with said arms and passing through openings in the upper part of the stationary frame, two separated plates or collars through which each rod passes, one of said collars bearing against the frame, a series of coil-springs interposed between the said collars and arranged around the tension-rod and outside of the latter, a ball-joint connection between the tension-rod and one of the collars, and rods passing through the frame and the collars on opposite sides of the tension-rod and held in place by nuts, substantially as described.

13. In pulverizing-rolls, the combination with a stationary frame and swinging arms, of tension-rods connected with the arms and passing through openings formed in the upper part of the frame, two separated collars through which each tension-rod also passes, springs interposed between the collars outside of the tension-rod which is connected with the collar remote from the frame, the collar adjacent the frame having a rounded projection engaging a counterpart recess formed in the frame, the said last-named collar having an opening larger than the rod to allow the collar a tilting movement incident to the unequal tension of the individual springs, without strain on the rod, substantially as described.

14. In pulverizing-rolls, the combination with a stationary frame and swinging arms, of tension-rods connected with the swinging arms and passing through openings formed in the upper part of the frame, said openings being larger than the rods, separated collars having openings through which the tension-rods also pass, a series of coil-springs interposed between said collars outside of the rod, other rods connecting the collars with the frame, and a nut applied to one extremity of the rod and bearing against the collar remote from the frame, its bearing-surface being rounded to engage a counterpart socket formed in the collar, to allow the rod a ball-joint movement.

15. In pulverizing-rolls, the combination with a stationary frame and swinging arms, of tension-rods connected with the swinging arms and passing through openings formed in the frame, said openings being larger than the rods, separated collars having openings through which the tension-rods also pass, a number of coil-springs interposed between said collars outside of the rod, and a nut applied to one extremity of the rod and bearing against the collar remote from the frame, its bearing-surface being rounded to engage a counterpart socket formed in the collar, the said nut being composed of two parts one of which performs the function of a lock-nut.

16. In pulverizing-rolls, the combination with a stationary frame and swinging arms, of tension-rods connected with the swinging arms and passing through openings formed in the frame, separated collars through which the tension-rods pass, a number of coil-springs interposed between said collars outside of the rod, a nut applied to one extremity of the rod and bearing against the collar remote from the frame, its bearing-surface being rounded to engage a counterpart socket formed in the collar to allow the rod a ball-joint movement, the said nut being composed of two parts one of which performs the function of a lock-nut, and a cap applied to the rod extremity and surrounding the nut, the said cap having an enlarged opening through which the rod extremity passes, and suitable means for locking the cap in place.

17. In pulverizing-rolls, the combination with a stationary frame and swinging arms, of tension-rods connected with the swinging arms and passing through openings formed in the frame, separated collars through which the tension-rods pass, a number of coil-springs interposed between said collars outside of the rod, a nut applied to one extremity of the rod and bearing against the collar remote from the frame, its bearing-surface being rounded to engage a counterpart socket formed in the collar to allow the rod a ball-joint movement, the said nut being composed of two parts one of which performs the function of a lock-nut, and a cap applied to the rod extremity and surrounding the nut, the said cap having an enlarged opening through which the rod extremity passes, suitable means for locking the cap in place, comprising lugs located on each side of the cap and having keyways, and keys inserted in said ways and engaging an annular flange with which the cap is provided.

18. The combination of a roll-shaft having a circumferential groove near one extremity, of a two-part ring engaging said groove and projecting beyond the same, and a series of washers surrounding the shaft adjacent the groove and adapted to be shifted from one side to the other of the ring to permit the endwise movement of the shaft.

19. The combination with a roll-shaft having a circumferential groove near one extremity, a two-part ring engaging said shaft and projecting beyond the same, a series of washers surrounding the shaft adjacent to the groove and adapted to be shifted from one side to the other of the same and limit endwise movement of the shaft, and a cap applied to the end of the shaft and surrounding the washers, the said cap being suitably secured in place.

20. In a pulverizing-roll construction, the combination with a suitable frame, of swinging arms, tension-rods connected with the swinging arms and passing through the frame, two separated collars through which each tension-rod passes, springs interposed between said collars outside of the tension-rod, other rods connecting the collars with the frame and controlling the tension of the springs independently of the tension-rod connected with the roll, and suitable means for connecting each tension-rod with the collar remote from the frame, to prevent the rod from moving outwardly through the collars.

21. In a pulverizing-roll construction, the combination with a tension-rod connected with the movable roll and passing through the frame, of two separated collars through which the tension-rod passes, springs interposed between said collars outside of the tension-rod, other rods connecting the collars with the frame and controlling the tension of the springs independently of the main tension-rod or that connected with the roll, a nut screwed on the main tension-rod extremity adjacent the collar, a cap applied to the last-named nut, and keys for locking the cap in place on the collar, substantially as described.

In testimony whereof I affix my signature in presence of two witnesses.

WILLIAM C. DAVIS.

Witnesses:
C. A. YONT,
L. H. WHEELER.